(12) United States Patent
Cho

(10) Patent No.: US 7,561,381 B2
(45) Date of Patent: Jul. 14, 2009

(54) BASE MEMBER AND HARD DISK DRIVE HAVING THE SAME

(75) Inventor: Kyoung-man Cho, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 306 days.

(21) Appl. No.: 11/462,104

(22) Filed: Aug. 3, 2006

(65) Prior Publication Data
US 2007/0058299 A1    Mar. 15, 2007

(30) Foreign Application Priority Data
Sep. 9, 2005    (KR) ...................... 10-2005-0084252

(51) Int. Cl.
*G11B 21/08*    (2006.01)
(52) U.S. Cl. .................................................. 360/265.1
(58) Field of Classification Search .............. 360/265.1, 360/264.3, 257, 256.2, 256.4
See application file for complete search history.

(56) References Cited

U.S. PATENT DOCUMENTS

| | | | | |
|---|---|---|---|---|
| 5,659,449 A | * | 8/1997 | Brooks et al. | 360/265.1 |
| 5,864,449 A | * | 1/1999 | Dominguez et al. | 360/265.1 |
| 5,943,187 A | * | 8/1999 | Chen et al. | 360/235.2 |
| 6,134,086 A | * | 10/2000 | Kim | 360/256 |
| 2006/0072246 A1 | * | 4/2006 | Fujimaki et al. | 360/235.1 |

FOREIGN PATENT DOCUMENTS

| | | |
|---|---|---|
| JP | 6-231549 | 8/1994 |
| JP | 2003-68037 | 3/2003 |
| KR | 1998-70100 | 10/1998 |

OTHER PUBLICATIONS

Korean Office Action dated Oct. 24, 2006 issued in KR 2005-84252.

* cited by examiner

*Primary Examiner*—Allen T Cao
(74) *Attorney, Agent, or Firm*—Stanzione & Kim, LLP

(57) ABSTRACT

A base member and a hard disk drive (HDD) having the base member. The base member includes a plate portion on which a head stack assembly (HSA) is pivotably mounted to record data in a disk or to read data recorded in the disk, and a crash stop portion which limits a pivoting range of the HSA and includes a boss integrally formed with the plate portion.

29 Claims, 3 Drawing Sheets

BASE MEMBER AND HARD DISK DRIVE HAVING THE SAME

CROSS-REFERENCE TO RELATED APPLICATIONS

This application claims the priority of Korean Patent Application No. 10-2005-0084252, filed on Sep. 9, 2005, in the Korean Intellectual Property Office, the disclosure of which is incorporated herein in its entirety by reference.

BACKGROUND OF THE INVENTION

1. Field of the Invention

The present general inventive concept relates to a hard disk drive (HDD), and more particularly, to a HDD that can precisely limit a rotation range of a head stack assembly (HSA).

2. Description of the Related Art

An HDD is one example of an auxiliary memory device used in computers, MP3 players, mobile phones, etc. The HDD records data in a disk or reads and reproduces the data recorded in the disk by using a head stack assembly (HSA) including a magnetic head. The HSA is mounted on a base member and pivots clockwise or counterclockwise such that the magnetic head moves to a location where the data is to be recorded in the disk or a location where the data has been recorded. The HDD includes a crash stop to limit a pivoting range of the HSA.

FIG. 1 is a cross-sectional view illustrating a conventional HDD including a crash stop 30.

Referring to FIG. 1, an HSA 15 is capable of pivoting within a range defined by a tail portion 16 and the crash stop 30. A voice coil motor (VCM) 20 is mounted on a base member 10 of the HDD to pivot the HSA 15. The voice coil motor 20 includes a pair of magnets 21 and 23 which are arranged on a lower part and an upper part of the tail portion 16, and a pair of yokes 25 and 27 to support the magnets 21 and 23. A VCM coil 17 is wound around the tail portion 16.

The crash stop 30 includes a pin 31 and a damper 33. The damper 33 is made of rubber and encloses the pin 31. The damper 33 is press-fitted into a hole in the lower yoke 25. Because of an assembly tolerance variation, the crash stop 30 may be mounted into the lower yoke 25 at a slant from a vertical orientation with respect to the base member 10. The assembly tolerance variation can occur upon press-fitting the damper 33. In addition, another assembly tolerance variation may exist when the lower yoke 25 is mounted on the base member 10. In this case, the overall assembly tolerance variations of the crash stop 30 increases, thereby affecting the pivoting range of the HSA 15. Accordingly, HDDs have different HSA pivoting ranges. Furthermore, if the pivoting range of the HSA 15 is less than a designed range, there is another problem in that a volume of data to be recorded in the disk is reduced.

SUMMARY OF THE INVENTION

The present general inventive concept provides a base member having a crash stop portion to protrude from the base member to limit a pivoting range of an HSA, and an HDD including the base member.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a base member usable in a hard disk drive (HDD) having a head stack assembly (HSA) pivotably mounted to record data in a disk or to read the data recorded in the disk, the base member including a plate portion on which the HSA is mounted and a crash stop portion which limits a pivoting range of the HSA and includes a boss integrally formed with the plate portion.

The plate portion and the boss of the crash stop portion may be integrally cast.

The crash stop portion may further include a damper enclosing the boss.

The foregoing and/or other aspects and utilities of the present general inventive concept may also be achieved by providing an HDD including a base member and an HSA pivotably mounted to record data in a disk or to read the data recorded in the disk, the base member including a plate portion on which the HSA is mounted, and a crash stop portion to limit a pivoting range of the HSA and having a boss integrally formed with the plate portion.

The plate portion and the boss of the crash stop portion may be integrally cast.

The boss of the crash stop portion may vertically project from the surface of the plate portion.

The crash stop portion may further include a damper enclosing the boss.

The foregoing and/or other aspects and utilities of the present general inventive concept may also be achieved by providing an HDD including a base member and an HSA pivotably mounted to record data in a disk or to read the data recorded in the disk, wherein the base member includes a plate portion on which the HSA is mounted, and a crash stop portion to limit a pivoting range of the HSA and having a boss integrally formed with the plate portion.

The plate portion and the boss of the crash stop portion may be integrally cast.

The boss of the crash stop portion may vertically project from the surface of the plate portion.

The crash stop portion may further include a damper enclosing the boss.

A voice coil motor (VCM) may be mounted on the base member to drive the HSA, and the VCM may have a hole for receiving the crash stop portion.

The foregoing and/or other aspects and utilities of the present general inventive concept may also be achieved by providing an HDD, including a base member and a cover member coupled to the base member to provide a space, an HSA having a front portion and a tail portion rotatably disposed in the space, and a crash stop portion having a boss formed with the base member in a single monolithic body to limit a rotation of the tail portion of the HSA.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
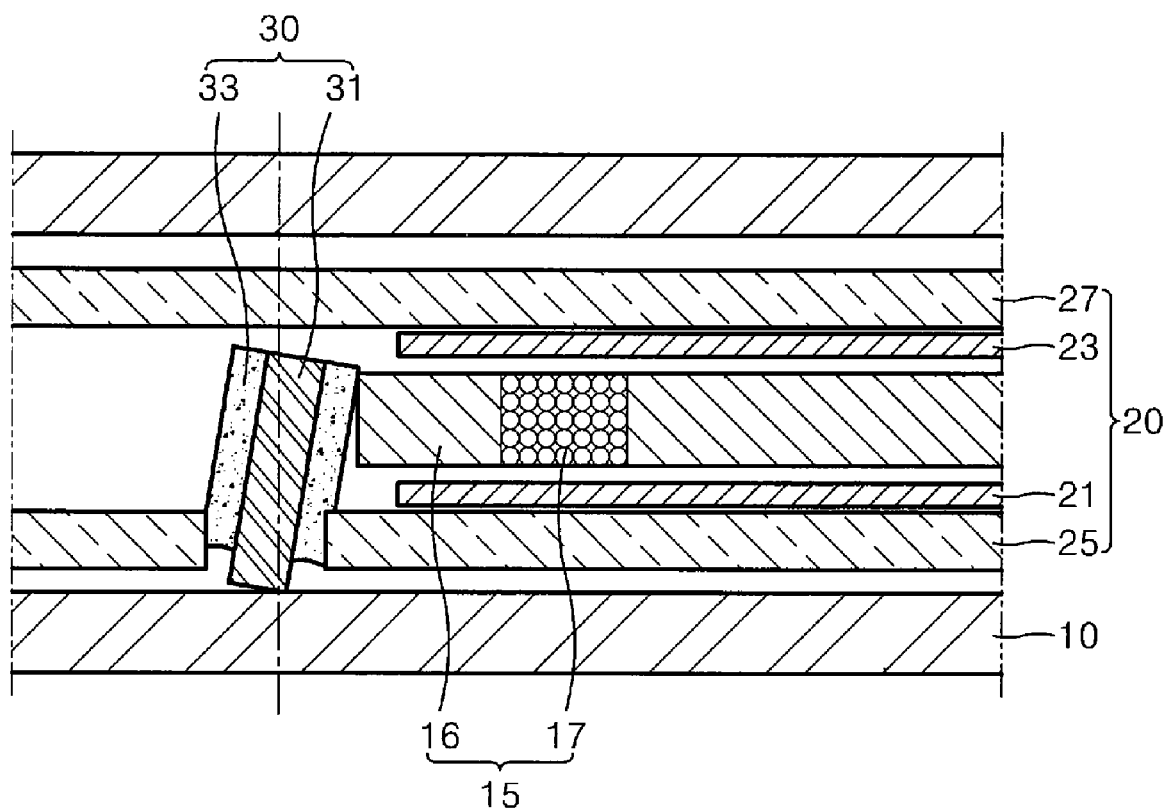
FIG. 1 is a cross-sectional view illustrating a conventional HDD having a crash stop.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
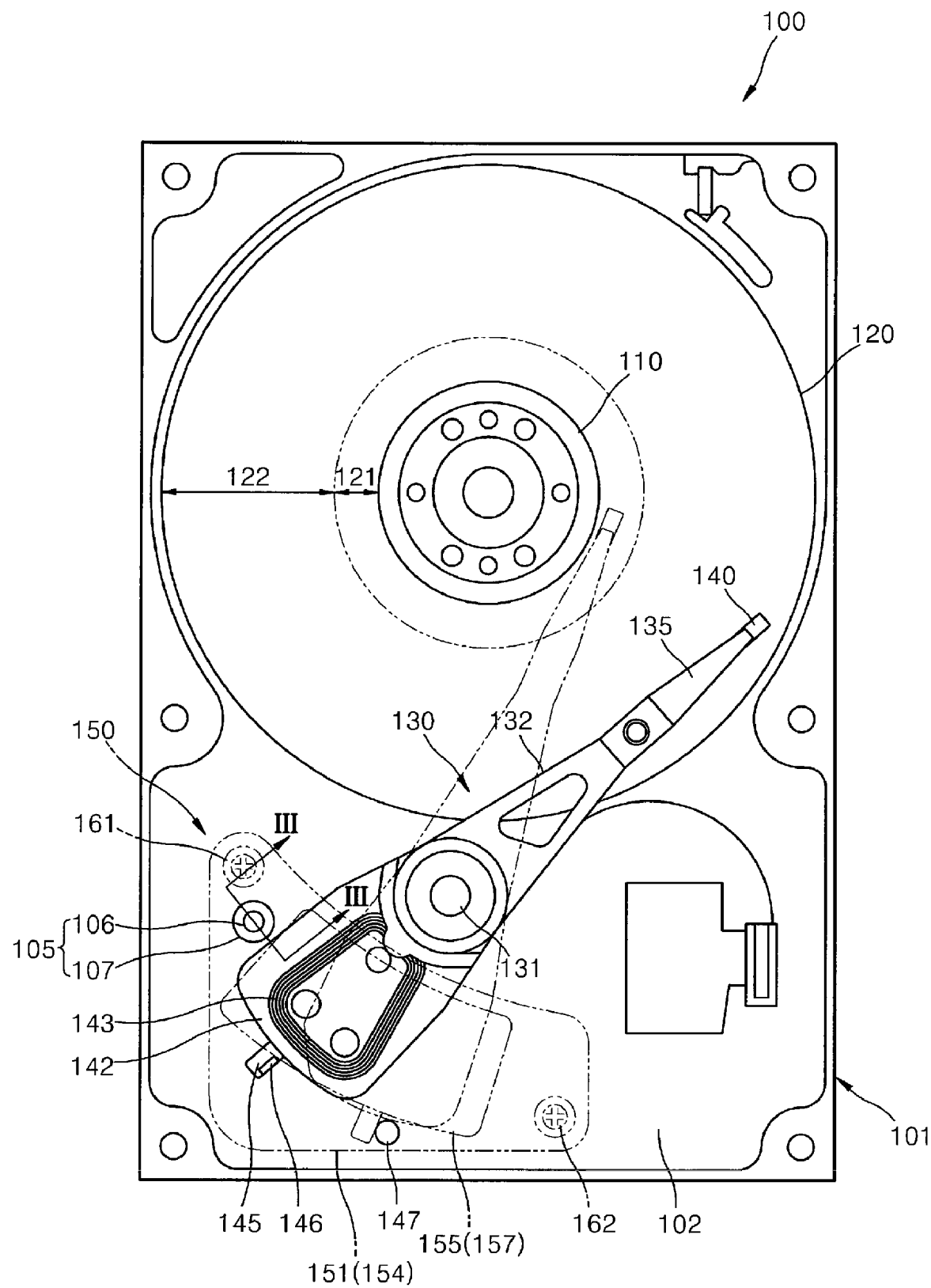
FIG. 2 is a plane view illustrating an HDD in accordance with an embodiment of the present general inventive concept.
Figure 3:
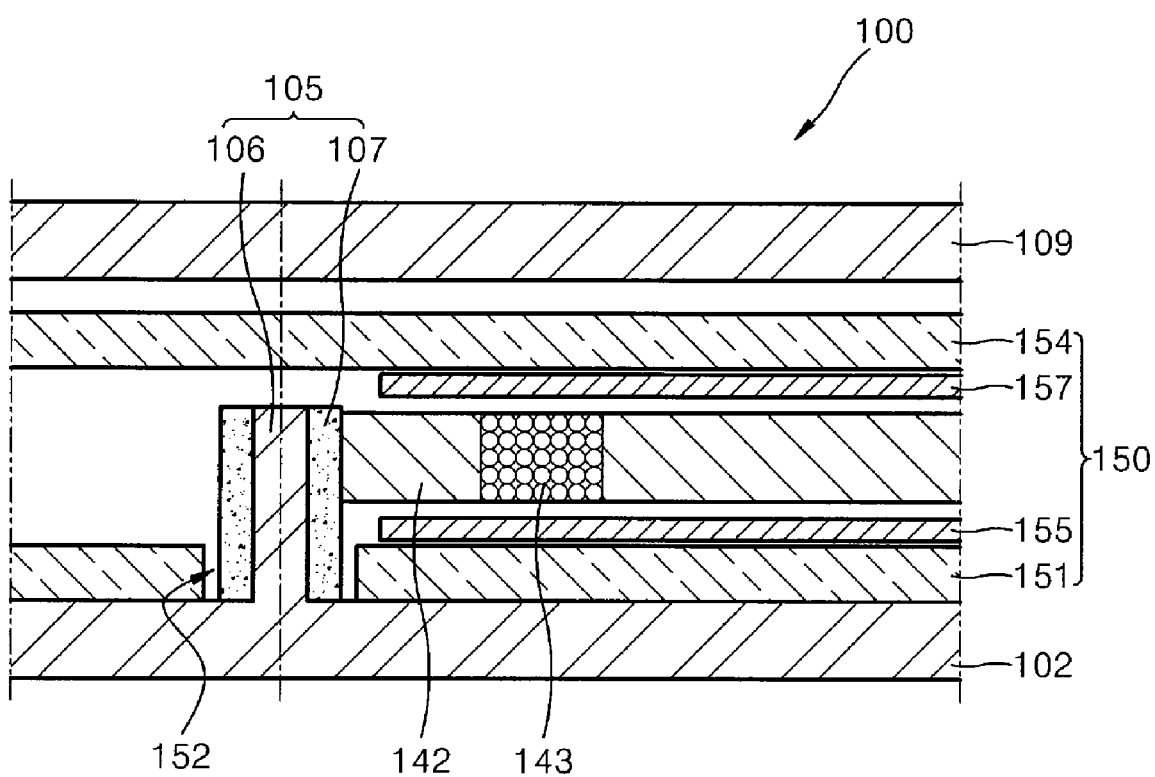
FIG. 3 is a cross-sectional view taken along line III-III of FIG. 2.

FIG. 2 is a plane view illustrating a hard disk drive (HDD) 100 in accordance with an embodiment of the present general inventive concept, and FIG. 3 is a cross-sectional view taken along line III-III of FIG. 2.

Referring to FIGS. 2 and 3, the HDD 100 includes a base member 101, a spindle motor 110 mounted on the base member 101, and a disk 120, i.e., a data storage medium, mounted on and rotating with the spindle motor 110 at high speed. The HDD 100 also includes a head stack assembly (HSA) 130 having a slider 140 with a built-in magnetic head (not shown) to record or read data and recording or reading data by moving the slider 140 to a specific location on the disk 120 to record data or a specific location where data is recorded, and a cover member 109 connected to an outer circumferential portion of the base member 101 to protect the spindle motor 110, the disk 120, and the HSA 130.

The HSA 130 is connected to a plate portion 102 of the base member 101 to pivot around a rotation bearing 131. The HSA includes a swing arm 132, a suspension 135 connected to a front end of the swing arm 132, and the slider 140. The slider 140 is mounted on a front of the suspension 135 and includes the built-in magnetic head. The suspension 135 supports the slider 140 to elastically bias the slider 140 towards a surface of the disk 120. A voice coil motor (VCM) coil 143 is wound around a tail portion 142 of a back end of the HSA 130.

A VCM 150 to drive the HSA 130 is mounted on the plate portion 102 of the base member 101. The VCM 150 includes a lower magnet 155 and an upper magnet 157, which are arranged below and above the tail portion 142, respectively, so as to face the VCM coil 143. The lower magnet 155 and the upper magnet 157 are attached to a lower yoke 151 and an upper yoke 154, respectively. The upper and lower yokes 151 and 154 are spaced apart from each other and fixedly connected to the plate portion 102 of the base member 101 by fixing screws 161 and 162. The rotation of the HSA 130 is controlled by a servo control system. The HSA 130 pivots in a direction according to Fleming's left hand rule by the interaction of an electric current input to the VCM coil 143 and a magnetic field of the pair of magnets 155 and 157.

When the HDD 100 does not operate, that is, when the disk 120 stops rotating, the slider 140 is parked so as not to crash into the disk 120. Parking systems for magnetic heads are divided into a ramp loading type and a contact start stop (CSS) type. The ramp loading parking system has a ramp outside of the disk and the magnetic head is parked on the ramp. The HDD 100 may include a CSS parking system. When the disk 120 stops rotating, the HSA 130 pivots counterclockwise. Accordingly, the slider 140 moves from a data zone 122 of the disk 120 where the data is recorded to a parking zone 121 in an inner circumferential area of the disk 120 where the data is not recorded, and is parked in the parking zone 121. When the HDD 100 starts operating and the disk 120 starts rotating, the HSA 130 pivots clockwise so that the slider 140 moves to the data zone 122 and the magnetic head built in the slider 140 records or reads data.

The HDD 100 also includes a locking unit to lock the HSA 130 when the slider 140 is parked. That is, the locking unit prevents the slider 140 from unnecessarily pivoting and moving from the parking zone 121 onto the data zone 122 due to external impact or vibrations when the HDD does not operate. If the slider 140 moves on the data zone 122 of the disk 120 when the disk 120 does not rotate, the slider 140 can come directly into contact with a surface of the data zone 122, and thus, the magnetic head built in the slider 140 may be inadvertently damaged.

The locking unit includes a locking rotor 145 formed to protrude from an end of the tail portion 142 of the HSA 130, and a locking stator 147 fixedly mounted on the pair of yokes 151 and 154. The locking rotor 145 includes a magnet 146. The locking stator 147 may be made of a magnetic material which can be attracted by the magnet 146. When the slider 140 moves to the parking zone 121 by the locking stator 147, the locking rotor 145 and the locking stator 147 stick together due to attraction force between the locking stator 147 and the magnet 146 in a parking state. The HSA 130 remains in the parking state, thereby not pivoting in response to any external disturbance. However, when a current is input to the VCM coil 143, a driving power of the HSA 130 due to the interaction between the magnetic field generated by the current of the VCM coil 143 and the magnetic field generated by the upper and lower magnets 155 and 157 exceeds the attraction force between the locking rotor 145 and the locking stator 147. Then, the HSA 130 is released from the parking state and the slider 140 moves from the parking zone 121 to the data zone 122. Meanwhile, the locking rotor 145 and the locking stator 147 can limit a counterclockwise pivoting range of the HSA 130, thereby preventing the slider 140 from crashing with the spindle motor 110 on the inner circumferential side of the disk 120.

The base member 101 includes a crash stop portion 105 to limit a clockwise pivoting range of the HSA 130. The crash stop portion 105 includes a boss 106 which is integrally cast with the plate portion 102 of the base member 101, and a damper 107 which may be made of a shock-absorbing material, for example, rubber, to enclose the boss 106. The HSA 130 can pivot up to the point where the tail portion 142 intersects with the crash stop portion 105. The damper 107 prevents the HSA 130 from being damaged by the intersection with the crash stop portion 105.

The boss 106 of the crash stop portion 105 vertically projects from the surface of the plate portion 102. As the boss 106 is integrally formed with the plate portion 102, the crash stop portion 105 has an accurate vertical position, compared to a conventional crash stop 30 (FIG. 1). Also, a hole 152 is provided in the lower yoke 151 of the VCM 150, to receive the crash stop portion 105. The hole 152 may also be referred to as a pass through hole or a crash stop boss pass area that is provided in any support plates that may be provided between the plate portion 102 and the HSA 130.

In accordance with the description as provided above, the present general inventive concept provides an the HDD that does not have any assembly tolerance variation caused by press-fitting the crash stop in the lower yoke and mounting the lower yoke on the base member. Accordingly, it is possible to regularly maintain the pivoting range of the HSA. Furthermore, as the pivoting range of the HSA is not smaller than the designed range, it is possible to prevent the reduction in a volume of data to be recorded.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A base member usable in a hard disk drive (HDD) having a head stack assembly (HSA) pivotably mounted to record data in a disk or to read data recorded in the disk, the base member comprising:
   a plate portion on which the HSA is mounted; and
   a crash stop portion which limits a pivoting range of the HSA and includes a boss integrally formed with the plate portion, and having a damper formed around the boss to absorb a contact force generated from a non-contact state to a contact state between the boss and the HSA,
   wherein the crash stop portion and the plate portion are formed in a single body.

2. The base member of claim 1, wherein the plate portion and the boss of the crash stop portion are integrally cast with each other.

3. The base member of claim 1, wherein the boss of the crash stop portion vertically projects from a surface of the plate portion.

4. The base member of claim 1, wherein the crash stop portion comprises a damper enclosing the boss.

5. A hard disk drive (HDD) including a base member and a head stack assembly (HSA) pivotably mounted on the base member to record data in a disk or to read data recorded in the disk, the base member comprising:
   a plate portion on which the HSA is mounted; and
   a crash stop portion to limit a pivoting range of the HSA and having a boss integrally formed with the plate portion, and having a damper formed around the boss to absorb a contact force generated from a non-contact state to a contact state between the boss and the HSA,
   wherein the crash stop portion and the plate portion are formed in a single body.

6. The HDD of claim 5, wherein the plate portion and the boss of the crash stop portion are integrally cast with each other.

7. The HDD of claim 5, wherein the boss of the crash stop portion vertically projects from the surface of the plate portion.

8. The HDD of claim 5, wherein the crash stop portion further comprises a damper enclosing the boss.

9. The HDD of claim 5, further comprising:
   a voice coil motor to drive the HSA provided on the base member,
   wherein the voice coil motor includes a hole to receive the crash stop portion.

10. An HDD, comprising:
    a base member and a cover member coupled to the base member to provide a space;
    an HSA having a front portion and a tail portion rotatably disposed in the space; and
    a crash stop portion having a boss formed with the base member in a single monolithic body to limit a rotation of the tail portion of the HSA, and having a damper formed on the boss to absorb a contact force generated from the tail portion of the HSA,
    wherein the crash stop portion and the plate portion are formed in a single body.

11. The HDD of claim 10, wherein the boss protrudes from a plate portion of the base member by a height, and the crash stop portion comprises a damper to surround the boss and to contact the plate portion of the base member.

12. The HDD of claim 11, wherein the damper has the same height as the boss.

13. The HDD of claim 10, further comprising:
    a VCM disposed in the space,
    wherein the HSA rotatably disposed in the VCM, the VCM has a surface to define a hole to accommodate the crash stop portion.

14. The HDD of claim 13, wherein the surface of the VCM does not contact the crash stop portion.

15. The HDD of claim 10, further comprising:
    a VCM having one or more yokes and one or more magnets,
    wherein the HSA is rotatably disposed to face the one or more magnets, and one of the one or more yokes comprise a surface spaced apart from the crash stop portion to define the hole to receive the crash stop portion.

16. The HDD of claim 15, wherein the crash stop portion comprises a damper formed on the boss, and the surface of the one or more yokes is spaced apart from the damper.

17. The HDD of claim 10, further comprising:
    a VCM to control the HSA to rotate,
    wherein the crash stop portion does not contact the VCM.

18. The HDD of claim 10, further comprising:
    a VCM disposed in the space and having an upper yoke and a lower yoke formed on the base member, an upper magnet mounted on the upper yoke, and a lower magnet mounted on the lower yoke to face the upper magnet,
    wherein the HSA is rotatably disposed in a second space between the upper magnet and the lower magnet.

19. The HDD of claim 18, wherein:
    the boss of the crash stop portion protrudes from a plate portion of the base member; and
    the lower yoke is directly formed on the plate portion of the base member.

20. The HDD of claim 19, wherein:
    the lower yoke comprises a cylindrical surface to define a hole through which the crash stop portion protrudes; and
    the cylindrical surface does not contact the crash stop portion.

21. An HDD, comprising:
    a base member;
    a yoke portion disposed above the base member and having a side to define a hole;
    an HSA having a front portion and a tail portion rotatably disposed above the yoke portion; and
    a crash stop portion having a boss formed with the base member in a single monolithic body to protrude from the base member through the hole to limit a rotation of the tail portion of the HSA.

22. The HDD of claim 21, wherein the crash stop portion is spaced apart from the side of the yoke portion.

23. The HDD of claim 22, wherein the crash stop portion comprises a damp disposed between the boss and the tail portion of the HSA and spaced apart from the side of the yoke portion.

24. The HDD of claim 21, wherein the tail portion of the HSA has a height with respect to the yoke portion, and the crash stop portion has a second height with respect to the yoke portion to correspond to the height of the tail portion of the HSA.

25. The HDD of claim 21, wherein the crash stop portion comprises damp disposed to be deformed between the boss and the tail portion of the HSA according to a contact with the tail portion of the HSA.

26. An HDD, comprising:

a base member;

an HSA having a front portion and a tail portion rotatably disposed above the base member; and a crash stop portion having a boss formed with the base member in a single monolithic body and a damper disposed between the boss and the tail portion of the HSA, the boss and the damper having a height to correspond to the HSA to limit a rotation of the tail portion of the HSA.

27. The HDD of claim 26, wherein the boss of the crash stop portion is formed at a position to determine a contact with the tail portion of the HSA, and the damper is deformed between the boss and the tail portion of the HSA.

28. The HDD of claim 26, wherein the damper has an inside surface not movable with respect to the boss, and an outside moveable with respect to the boss according to a contact with the tail portion of HSA.

29. The HDD of claim 26, wherein the crash stop portion is formed at a first portion of the base member and the HSA is rotatably disposed at a second position of the base member such that a contact between the HSA and the crash stop portion is predetermined.

* * * * *